United States Patent [19]

Imai

[11] Patent Number: 4,662,723
[45] Date of Patent: May 5, 1987

[54] FLARE STOP FOR A LARGE APERTURE RATIO ZOOM LENS SYSTEM

[75] Inventor: Toshihiro Imai, Tokyo, Japan

[73] Assignee: Olympus Optical Co., Ltd., Tokyo, Japan

[21] Appl. No.: 688,157

[22] Filed: Dec. 31, 1984

[30] Foreign Application Priority Data

Jan. 18, 1984 [JP] Japan .................... 59-5761

[51] Int. Cl.⁴ .................... G02B 5/20; G02B 9/64; G02B 15/16
[52] U.S. Cl. .................... 350/426; 350/336; 350/450
[58] Field of Search ............ 350/426, 450, 336

[56] References Cited

U.S. PATENT DOCUMENTS

| | | | |
|---|---|---|---|
| 4,168,110 | 9/1979 | Itoh . | |
| 4,367,927 | 1/1983 | Fujii | 350/426 |
| 4,474,436 | 10/1984 | Itoh | 350/426 |
| 4,487,482 | 12/1984 | Itoh et al. | 350/450 |

FOREIGN PATENT DOCUMENTS

| | | |
|---|---|---|
| 2406892 | 8/1974 | Fed. Rep. of Germany . |
| 3133411 | 4/1982 | Fed. Rep. of Germany . |
| 40-20147 | 9/1965 | Japan . |
| 49-122348 | 11/1974 | Japan . |
| 0023011 | 2/1983 | Japan .................... 350/336 |

Primary Examiner—John K. Corbin
Assistant Examiner—Rebecca D. Gass
Attorney, Agent, or Firm—Cushman, Darby & Cushman

[57] ABSTRACT

A flare stop for a large aperture ratio zoom lens system comprising a diverging lens group and a converging lens group and arranged to be zoomed by moving the diverging lens group and converging lens group along the optical axis so that the airspace between those lens groups becomes smaller in the teleposition, the flare stop being arranged in the converging lens group so as to be moved integrally with the converging lens group and arranged that the inner diameter thereof is varied in co-operation with zooming.

7 Claims, 5 Drawing Figures

FLARE STOP FOR A LARGE APERTURE RATIO ZOOM LENS SYSTEM

BACKGROUND OF THE INVENTION (a) Field of the Invention:

The present invention relates to a flare stop and, more particularly, to a flare stop to be used with a large aperture ratio zoom lens system in order to shut off offaxial rays which cause flare.

(b) Description of the Prior Art:

Known zoom lens systems in which a stop, which is arranged that the diameter thereof is varied in co-operation with the movement of lens groups for the purpose of zooming, is provided in addition to an aperture stop are disclosed, for example, in Japanese published examined patent application No. 20147/65 and Japanese published unexamined patent application No. 122348/74.

Out of them, the known zoom lens system disclosed in Japanese published examined patent application No. 20147/65 is arranged that a movable lens which retracts is provided with a flare stop, which is arranged that the diameter thereof is varied in co-operation with the movement of said movable lens, in order to prevent flare which is caused by rays reflected by the inner surface of the lens mount and which increases according to the retracting movement of said movable lens.

Said flare stop in said known zoom lens system resembles the flare stop according to the present invention from the view point that the diameter thereof is varied in co-operation with the movement of the movable lens. However, the object of said known flare stop is different from the object of the flare stop according to the present invention arranged to eliminate coma flare which occurs in the portion of intermediate image height when a zoom lens system with a constant F number is put to the state of wide position as described later in detail.

The flare stop disclosed in Japanese published unexamined patent application No. 122348/74 is provided to a zoom lens system, which comprises a movable subsystem and a fixed subsystem, in order to shut off the unnecessary offaxial rays when arranging the lens system as a double zooming system so as to make the field angle wider by further providing a movable lens group in the fixed subsystem, which has a stop at the front part thereof. Therefore, the object, functions, etc. of said flare stop are also different from those of the flare stop according to the present invention.

SUMMARY OF THE INVENTION

It is, therefore, a primary object of the present invention to provide a flare stop to be used with a zoom lens system comprising at least a diverging lens group and a converging lens group like a zoom lens system which comprises two lens groups, i.e., a front diverging lens group and a rear converging lens group, and arrnged to be zoomed by moving those lens groups along the optical axis, said flare stop being arranged so as to be moved integrally with said converging lens group and, at the same time, so as to vary the inner diameter thereof in order to thereby improve the quality of image in the portion of intermediate field angle when a zoom lens system with a large aperture ratio and a constant F number is put to the state of wide position.

When arranging a zoom lens system so that it has a large aperture ratio, in case of a lens system like a zoom lens system comprising two lens groups including a diverging lens group and a converging lens group, the diameter of paraxial rays in the teleposition becomes large at the converging lens group when it is attempted to keep the F number constant and, therefore, diameter of lenses constituting the converging lens group become necessarily large. Consequently, the diameter of rays in the portion of intermediate field angle in the wide position becomes unnecessarily large, and correction thereof is very difficult.

The present invention provides a flare stop to be used with a zoom lens system described in the above and to be provided in the converging lens group so that the diameter of said flare stop is varied in co-operation with zooming, said flare stop being arranged to cut the rays at the intermediate field angle, the diameter of which becomes unnecessarily large as described in the above, by varying the diameter of said flare stop so as to become small in the wide position, and to thereby improve the quality of image in the wide position so that the performance of the large aperture ratio zoom lens system becomes favourable.

Now, the above-mentioned flare stop for a large aperture ratio zoom lens system according to the present invention is described in further detail in the following.

As explained before, in case of a zoom lens system comprising a diverging lens group and a converging lens group in which there is an airspace between said lens groups which becomes large in the wide position, the effective diameter of the converging lens group should be made very large in order to obtain sufficient rays in the teleposition when it is attempted to keep the F number constant. This tendency becomes especially conspicuous when making the aperture ratio of the lens system large.

Besides, to correct spherical aberration to be caused when the aperture ratio of the lens system is made large, the radius of curvature of the surface on the image side of a negative lens arranged in the converging lens group should be made small. At that time, upper rays of offaxial rays are overcorrected in the wide position, and large coma flare is caused.

However, to obtain sufficient paraxial rays in the teleposition, the effective diameter of the converging lens group should be made large as explained in the above. Consequently, it is impossible to shut off the offaxial rays in the wide position which cause the above-mentioned coma flare. Therefore, it has been difficult to make the aperture ratio of a wide angle zoom lens system large.

The present invention provides a flare stop to be arranged in the converging lens group in order to shut off the upper rays of offaxial rays in the wide position, said flare stop being arranged that the inner diameter thereof is varied in co-operation with zooming, i.e., arranged that the diameter thereof becomes small in the wide position.

It is most effective when the inner diameter of said flare stop is decided according to the maximum height of paraxial rays at each focal length.

As the flare stop of which the inner diameter is varied as described in the above, it is possible to utilize a liquid crystal cell, diaphragm blades, etc.

DETAILED DESCRIPTION OF THE PREFERRED EMBODIMENT

Now, a preferred embodiment when using the flare stop according to the present invention in an actual zoom lens system is shown below.

Figure 1:
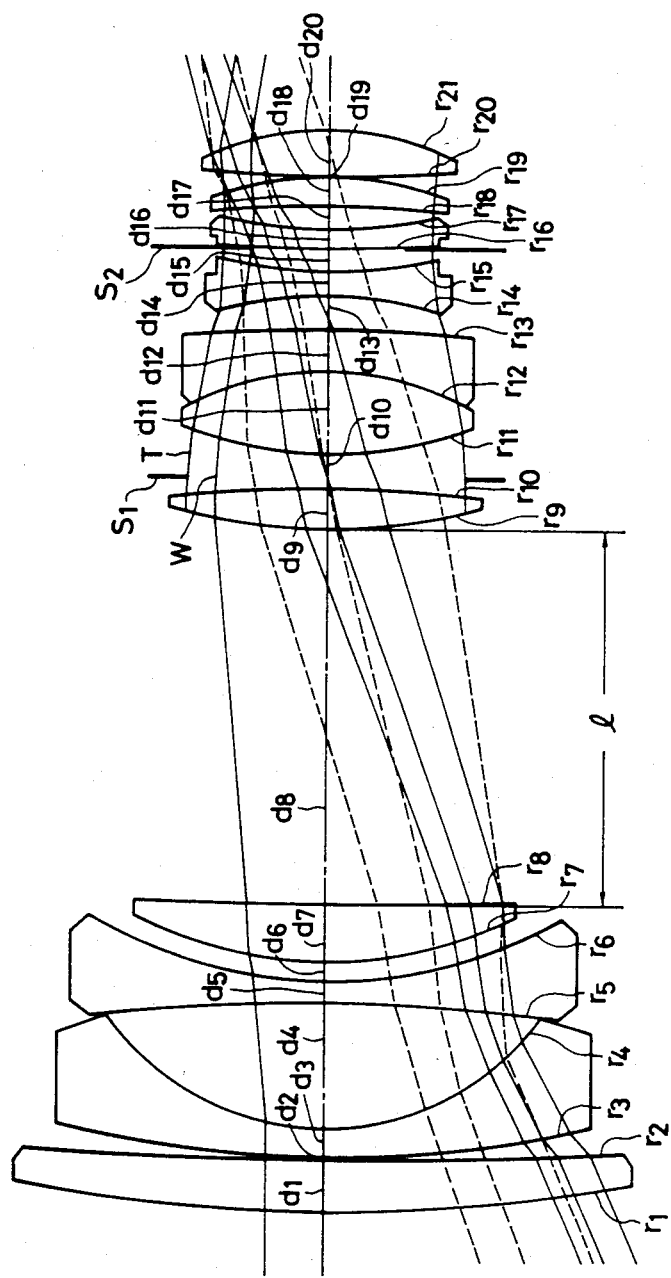
FIG. 1 shows a sectional view illustrating an example of composition of a zoom lens system comprising two lens groups to which the flare stop according to the present invention is applied.

The following numerical data show an example of a zoom lens system to which the flare stop according to the present invention is applied, and said zoom lens system has the lens configuration as shown in FIG. 1.

| | | |
|---|---|---|
| $r_1 = 136.9$ | | |
| $d_1 = 4.3$ | | $n_1 = 1.8044$ |
| $r_2 = 493.22$ | | |
| $d_2 = 0.1$ | | |
| $r_3 = 102.53$ | | |
| $d_3 = 2.3$ | | $n_2 = 1.7995$ |
| $r_4 = 23.1$ | | |
| $d_4 = 10.36$ | | |
| $r_5 = -191.0$ | | |
| $d_5 = 1.9$ | | $n_3 = 1.6127$ |
| $r_6 = 38.98$ | | |
| $d_6 = 1.58$ | | |
| $r_7 = 35.87$ | | |
| $d_7 = 4.9$ | | $n_4 = 1.8044$ |
| $r_8 = 490.18$ | | |
| $d_8 = l$ | | |
| $r_9 = 52.693$ | | |
| $d_9 = 3.2$ | | $n_5 = 1.6968$ |
| $r_{10} = -150.595$ | | |
| $d_{10} = 2.7$ | | |
| $r_{11} = 32.996$ | | |
| $d_{11} = 6.95$ | | $n_6 = 1.6968$ |
| $r_{12} = -25.5$ | | |
| $d_{12} = 3.51$ | | $n_7 = 1.7432$ |
| $r_{13} = -109.82$ | | |
| $d_{13} = 2.57$ | | |
| $r_{14} = -38.396$ | | |
| $d_{14} = 1.93$ | | $n_8 = 1.7495$ |
| $r_{15} = 39.54$ | | |
| $d_{15} = 1.8$ | | |
| $r_{16} = 226.35$ | | |
| $d_{16} = 1.69$ | | $n_9 = 1.80518$ |
| $r_{17} = 40.176$ | | |
| $d_{17} = 1.79$ | | |
| $r_{18} = -89.40$ | | |
| $d_{18} = 2.31$ | | $n_{10} = 1.6779$ |
| $r_{19} = -34.09$ | | |
| $d_{19} = 0.1$ | | |
| $r_{20} = 208.858$ | | |
| $d_{20} = 3.8$ | | $n_{11} = 1.51633$ |
| $r_{21} = -26.80$ | | |
| $f = 28.99 \sim 48.32$, F/2.8 | | |
| $l = 31 \sim 0.8$ | | |

In the numerical data shown in the above, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indices of respective lenses, reference symbol f represent the focal length of the lens system as a whole, and reference symbol l represents the airspace which is varied at the time of zooming.

The flare stop according to the present invention (represented by reference symbol $S_2$ in FIG. 1) in said embodiment is located between the surface $r_{15}$ and surface $r_{16}$ in the converging lens group and is arranged that the inner diameter of the flare stop is varied so that the inner edge thereof, which exists at the position of the maximum height T of paraxial rays which pass through the lens system when the lens system is in the teleposition, moves to the position of the maximum height W of paraxial rays which pass through the lens system when the lens system is put to the wide position. Reference symbol $S_1$ in FIG. 1 represents an aperture stop.

Figure 2:
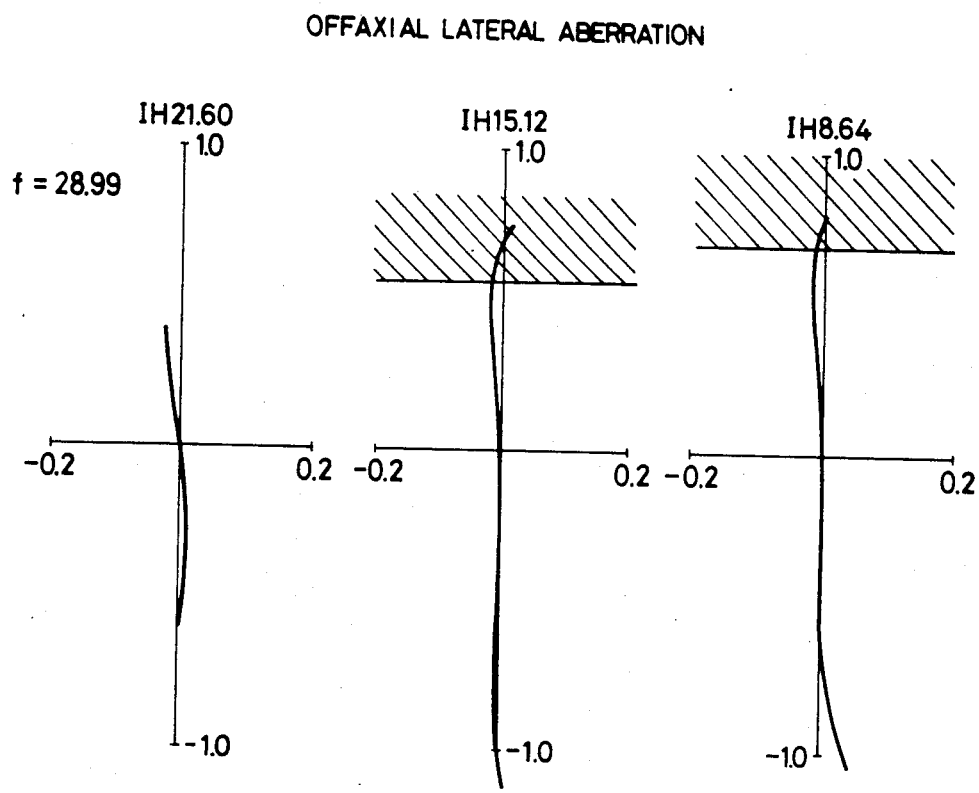
FIGS. 2 and 3 respectively show graphs illustrating aberration curves of the zoom lens system shown in FIG. 1.
Figure 3:
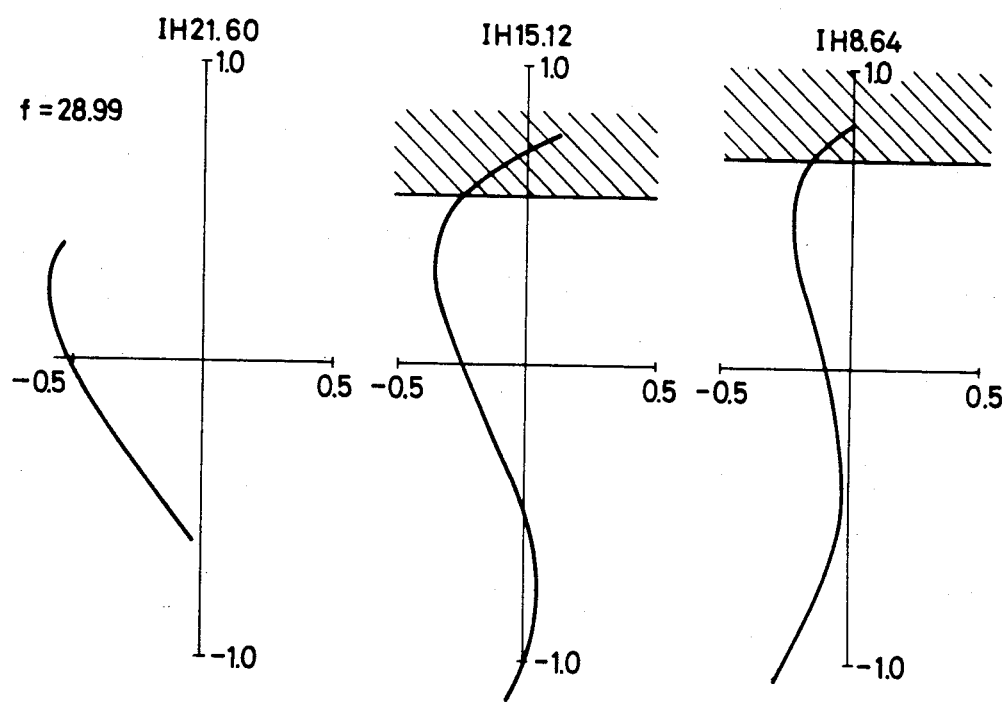

When the above-mentioned flare stop according to the present invention is used, rays in the hatched portion are cut as shown in FIGS. 2 and 3 when the lens system is put to the wide position. The sectional view in FIG. 1 and graphs of aberration curves in FIGS. 2 and 3 respectively show the sectional view and aberration curves when the zoom lens system is in the wide position.

Figure 4:
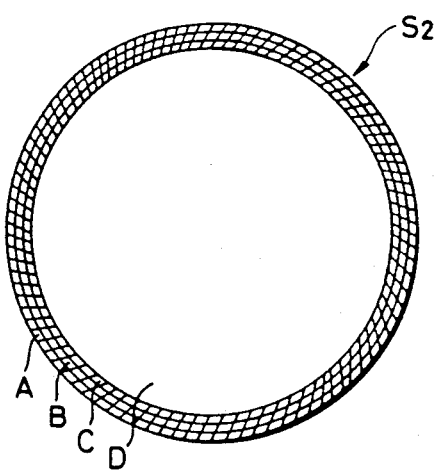
FIGS. 4 and 5 respectively show an example of composition of a liquid crystal cell to be used as the flare stop according to the present invention.
Figure 5:
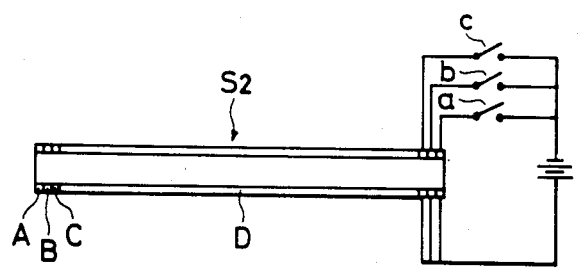

FIGS. 4 and 5 respectively show an example of composition when the flare stop $S_2$ according to the present invention is composed by employing a liquied crystal cell. Portions designated by reference symbols A, B and C respectively become opaque in turn according to zooming and shut off the rays. The portion designated by reference symbol D always remains transparent.

To vary the transparent portion of the above-mentioned flare stop, in which a liquid crystal cell is employed, in cooperation with zooming it may be arranged that the switches a, b and c shown in FIG. 5 are closed in turn in cooperation with the movements of the lens groups constituting the zoom lens system when said lens groups are moved from the teleposition toward the wide position of said zoom lens system.

When the flare stop according to the present invention described so far is used, it is possible to shut off the offaxial rays when a zoom lens system comprising a diverging lens group and a converging lens group is put to the state of wide position and, therefore, it is possible to remarkably improve the quality of image in the portion of intermediate field angle when said zoom lens system is put to the wide position. In case of a zoom lens system consisting of a front diverging lens group and a rear converging lens group only, an aperture stop is arranged on the object side of the rear lens group in most cases in order to prevent the front lens diameter from becoming large. When the flare stop according to the present invention is used when making the aperture ratio of the such zoom lens system large, it is especially effective for improving the quality of image in the portion of intermediate field angle in the wide position.

Besides, when a liquid crystal cell is employed for the flare stop, a mechanical structure for varying the inner diameter of the flare stop in cooperation with zooming is not needed and, therefore, the structure related to the flare stop becomes simple.

I claim:

1. A large aperture ratio zoom lens system comprising a diverging lens group, a converging lens group in the order from the object side, an aperture stop disposed between said diverging lens group and the rearmost position of said converging lens group and a flare stop arranged in said converging lens group and arranged to be zoomed by moving said diverging lens group and said converging lens group along the optical axis so that the airspace between said diverging lens group and said converging lens group becomes smaller in the teleposition, said flare stop being arranged so as to be moved integrally with said converging lens group and arranged that the inner diameter of said flare stop is varied in co-operation with the movements of said respective lens groups so that said inner diameter becomes small in the wide position and large in the teleposition.

2. A large aperture ratio zoom lens system according to claim 1 wherein said flare stop comprises a liquid crystal cell.

3. A large aperture ratio zoom lens system according to claim 1 further arranged to vary the inner diameter thereof so that said inner diameter becomes substantially equal to the maximum height to paraxial rays.

4. A large aperture ratio zoom lens system according to claim 2 wherein said zoom lens system consists of a front diverging lens group and a rear converging lens group and said flare stop is arranged in said rear converging lens group.

5. A large aperture ratio zoom lens system according to claim 3 wherein said flare stop comprises a liquid crystal cell.

6. A large aperture ratio zoom lens system according to claim 1 wherein said zoom lens system consists of a front diverging lens group and a rear converging lens group and said flare stop is arranged in said rear converging lens group.

7. A large aperture ratio zoom lens system according to claim 6 wherein said flare stop comprises a liquid crystal cell.

* * * * *